United States Patent
Mraz et al.

(10) Patent No.: US 8,776,254 B1
(45) Date of Patent: Jul. 8, 2014

(54) SYSTEM AND METHOD FOR THE SECURE UNIDIRECTIONAL TRANSFER OF SOFTWARE AND SOFTWARE UPDATES

(71) Applicant: Owl Computing Technologies, Inc., Ridgefield, CT (US)

(72) Inventors: Ronald Mraz, South Salem, NY (US); Gabriel Silberman, Hastings on Hudson, NY (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 50 days.

(21) Appl. No.: 13/748,045

(22) Filed: Jan. 23, 2013

(51) Int. Cl.
  G06F 7/04 (2006.01)
  H04L 29/06 (2006.01)
  G06F 21/60 (2013.01)

(52) U.S. Cl.
  CPC .................... *G06F 21/606* (2013.01)
  USPC ............................................. 726/26; 713/150

(58) Field of Classification Search
  USPC ........................................... 726/26; 713/150
  See application file for complete search history.

(56) References Cited

U.S. PATENT DOCUMENTS

| | | |
|---|---|---|
| 5,638,446 A | 6/1997 | Rubin |
| 5,703,562 A | 12/1997 | Nilsen |
| 5,745,679 A | 4/1998 | Mercer |
| 5,995,982 A | 11/1999 | Mercer |
| 6,151,708 A | 11/2000 | Pedrizetti et al. |
| 6,381,742 B2 | 4/2002 | Forbes et al. |
| 6,430,608 B1 | 8/2002 | Shaio |
| 6,694,434 B1 | 2/2004 | McGee et al. |
| 6,789,255 B1 | 9/2004 | Pedrizetti et al. |
| 6,883,168 B1 | 4/2005 | James et al. |
| 6,944,634 B2 | 9/2005 | Hertling et al. |
| 6,970,866 B1 | 11/2005 | Pravetz et al. |
| 7,089,248 B1 | 8/2006 | King et al. |
| 7,092,972 B2 | 8/2006 | Kashyap |
| 7,263,528 B2 | 8/2007 | Haff et al. |
| 7,280,956 B2 | 10/2007 | Cross et al. |
| 7,310,629 B1 | 12/2007 | Mendelson et al. |

(Continued)

FOREIGN PATENT DOCUMENTS

| | | |
|---|---|---|
| EP | 20457520 A2 | 8/2009 |
| EP | 2430548 A1 | 11/2010 |
| WO | WO20100132647 A1 | 11/2010 |
| WO | WO2012012266 A1 | 1/2012 |

OTHER PUBLICATIONS

Uk Intellectual Property Office, Combined Search and Examination Report under Sections 17 & 18(3), Dec. 23, 2013 (includes Search Report under Section 17 dated Dec. 20, 2013).

*Primary Examiner* — Mohammad W Reza
(74) *Attorney, Agent, or Firm* — John S. Economou (57) ABSTRACT

A system is disclosed that provides an authenticated payload, e.g., a software program or update, to a recipient device. A storage device stores a payload. A provider server coupled to the storage device outputs the payload and a manifest table. The manifest table includes information identifying the payload. A manifest engine TX server receives the payload and the manifest table from the provider server, generates information about the received payload, compares the information generated about the payload with the contents of the received manifest table, and, if the information about the received payload matches information for a particular one of the at least one payloads included in the received manifest table, forwards the payload to a one-way data link. The output of the one-way data link is coupled to a manifest engine RX server, which in turn forwards any received payload to a recipient device coupled to an output of the manifest engine RX server.

19 Claims, 8 Drawing Sheets

(56) References Cited

U.S. PATENT DOCUMENTS

| | | |
|---|---|---|
| 7,373,345 B2 | 5/2008 | Carpentier et al. |
| 7,386,574 B2 | 6/2008 | Abe et al. |
| 7,472,272 B2 | 12/2008 | Stamos et al. |
| 7,483,958 B1 | 1/2009 | Elabbady et al. |
| 7,502,754 B2 | 3/2009 | Campbell et al. |
| 7,558,797 B2 | 7/2009 | Li |
| 7,610,355 B2 | 10/2009 | Azuma et al. |
| 7,668,868 B1 | 2/2010 | King et al. |
| 7,707,424 B2 | 4/2010 | Axelsson |
| 7,756,826 B2 | 7/2010 | Bots et al. |
| 7,765,411 B2 | 7/2010 | Hennessey et al. |
| 7,805,468 B2 | 9/2010 | Takahashi |
| 7,814,551 B2 | 10/2010 | Darweesh et al. |
| 7,865,575 B2 | 1/2011 | Leitheiser |
| 7,874,015 B2 | 1/2011 | Aaron |
| 7,930,538 B1 | 4/2011 | Israel et al. |
| 7,934,091 B2 | 4/2011 | Stamos et al. |
| 7,992,209 B1 | 8/2011 | Menoher et al. |
| 8,010,680 B2 | 8/2011 | Crawford |
| 8,024,306 B2 | 9/2011 | Palliyil et al. |
| 8,024,462 B1 | 9/2011 | Zhu et al. |
| 8,041,946 B2 | 10/2011 | Bunn et al. |
| 8,069,349 B1 | 11/2011 | Israel et al. |
| 8,075,403 B2 | 12/2011 | O'Brien et al. |
| 8,103,870 B2 | 1/2012 | Clower et al. |
| 8,161,104 B2 | 4/2012 | Tomkow |
| 8,176,331 B2 | 5/2012 | Moreillon et al. |
| 8,191,165 B2 | 5/2012 | Aaron |
| 8,196,201 B2 | 6/2012 | Repasi et al. |
| 8,234,350 B1 | 7/2012 | Gu et al. |
| 8,250,235 B2 | 8/2012 | Harvey et al. |
| 8,352,450 B1 | 1/2013 | Mraz et al. |
| 2004/0133548 A1 | 7/2004 | Fielding et al. |
| 2012/0030768 A1 | 2/2012 | Mraz et al. |

SYSTEM AND METHOD FOR THE SECURE UNIDIRECTIONAL TRANSFER OF SOFTWARE AND SOFTWARE UPDATES

FIELD OF INVENTION

The present invention relates generally to secure transfer of digital information, including software, firmware and critical data, from a provider to one or more devices or recipients at their corresponding facilities. More particularly, the present invention relates to the use of manifest tables and one-way, hardware-enforced information transfers, to secure both the provider and recipients of such digital information.

BACKGROUND OF THE INVENTION

Protection of a computer or data network from undesired and unauthorized data disclosure, interception or alteration has been a perennial concern in the field of computer and network security. For example, firewall and anti-spyware software have been developed to address security concerns for computers and networks connected to the Internet and to protect them from possible cyber-attacks such as Trojan horse-type viruses or worms that may trigger undesired and unauthorized data disclosure by these computers and networks. However, for high security computer networks such as those used by government agencies and intelligence community and certain commercial applications, conventional network security devices such as firewalls may not provide sufficiently reliable protection from undesired data disclosure.

Alternative network security methods and devices based on unidirectional data transfer have been devised to address the network security concern. For example, U.S. Pat. No. 5,703,562 to Nilsen ("the '562 patent"), the contents of which are hereby incorporated by reference in its entirety, provides an alternative way to address the network security concern. The '562 patent discloses a method of transferring data from an unsecured computer to a secured computer over a one-way optical data link comprising an optical transmitter on the sending side and an optical receiver on the receiving side. By providing such an inherently unidirectional data link to a computer/data network to be protected, one can eliminate any possibility of unintended data leakage out of the computer/data network over the same link.

Any data link that strictly enforces the unidirectionality of data flow is called a one-way link or one-way data link. In other words, it is physically impossible to send information or data of any kind through a one-way data link in the reverse direction. A one-way data link may be hardware-based, software-based, or based on some combination of hardware and software.

Figure 1:
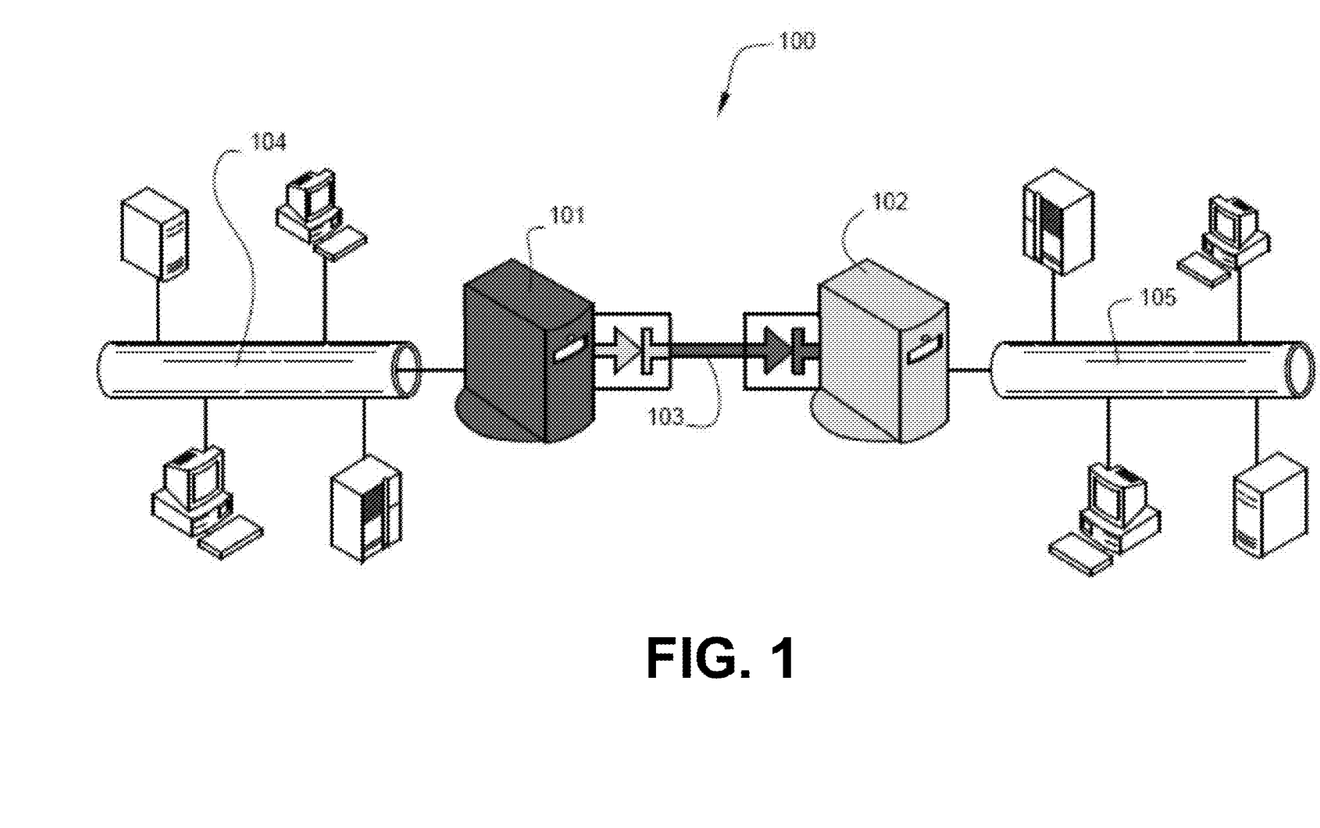
FIG. 1 schematically illustrates an example of a secure one-way data transfer system using a one-way data link.

One-way data transfer systems based on such one-way data links provide network security to data networks by isolating the networks from potential security breaches (i.e., undesired and unauthorized data flow out of the secure network) while still allowing them to import data from the external source in a controlled fashion. FIG. 1 schematically illustrates an example of one such one-way data transfer system 100. In the one-way data transfer system shown in FIG. 1, two computing platforms 101 and 102 (respectively, "the send platform" and "the receive platform") are connected to the unsecured external network 104 ("the source network") and the secure network 105 ("the destination network"), respectively. The send platform 101 is connected to the receive platform 102 by a one-way data link 103, which may be an optical link comprising, for example, a high-bandwidth optical fiber. This one-way optical data link 103 may be configured to operate as a unidirectional data gateway from the source network 104 to the secure destination network 105 by having its ends connected to an optical transmitter on the send platform and to an optical receiver on the receive platform.

A configuration such as the one shown in FIG. 1 physically enforces one-way data transfer at both ends of the optical fiber connecting the send platform 101 to the receive platform 102, thereby creating a truly unidirectional data transfer link between the source network 104 and the destination network 105. One-way data transfer systems based on a one-way data link are designed to transfer data or information in only one direction, making it physically impossible to transfer any kind of data, such as handshaking protocols, error messages, or busy signals, in the reverse direction. Such physically imposed unidirectionality in data flow cannot be hacked by a programmer, as is often done with firewalls, where unidirectional rules are software-protected (e.g., password authentication, etc.). Accordingly, the one-way data transfer system based on a one-way data link ensures that data residing on the isolated destination secure computer or network is maximally protected from any undesired and unauthorized disclosure. Alternatively, the source network is isolated from any malware contained in the destination network.

Software systems and applications, whether for direct use on a computer or embedded in other devices (e.g., firmware), often need to be installed and/or updated before initial use or periodically during the lifetime of such computer or device (i.e., to update to a new version or release). Such updates may add features, fix known problems and/or support the connection to or use of additional hardware and software components and systems. An initial software version or a software update (collectively a "payload" or "install payload") may be delivered by the software or device manufacturer (or its agent) via recorded physical digital media (e.g., CDs, DVDs, USB drives, hard drives, etc.) or by making it available on an online server for delivery to or retrieval by an end user of the software or device. In some cases, e.g., a surgically-implanted device having internal updatable software/firmware, the payload may only be loaded into the device at a physician's office or other secure healthcare facility via a specialized programming apparatus.

There are cases in which the install payload could be compromised as the result of malicious modifications to code residing either on a physical media or on an online server. In other scenarios, regulatory and/or security requirements may forbid the introduction of physical media into a facility where the systems requiring the install payload is needed, e.g., because of the secure nature of such facility. For these scenarios, connecting to any external network may also be forbidden because of the danger posed by information exfiltration and exposure to malware as discussed above.

Figure 2:
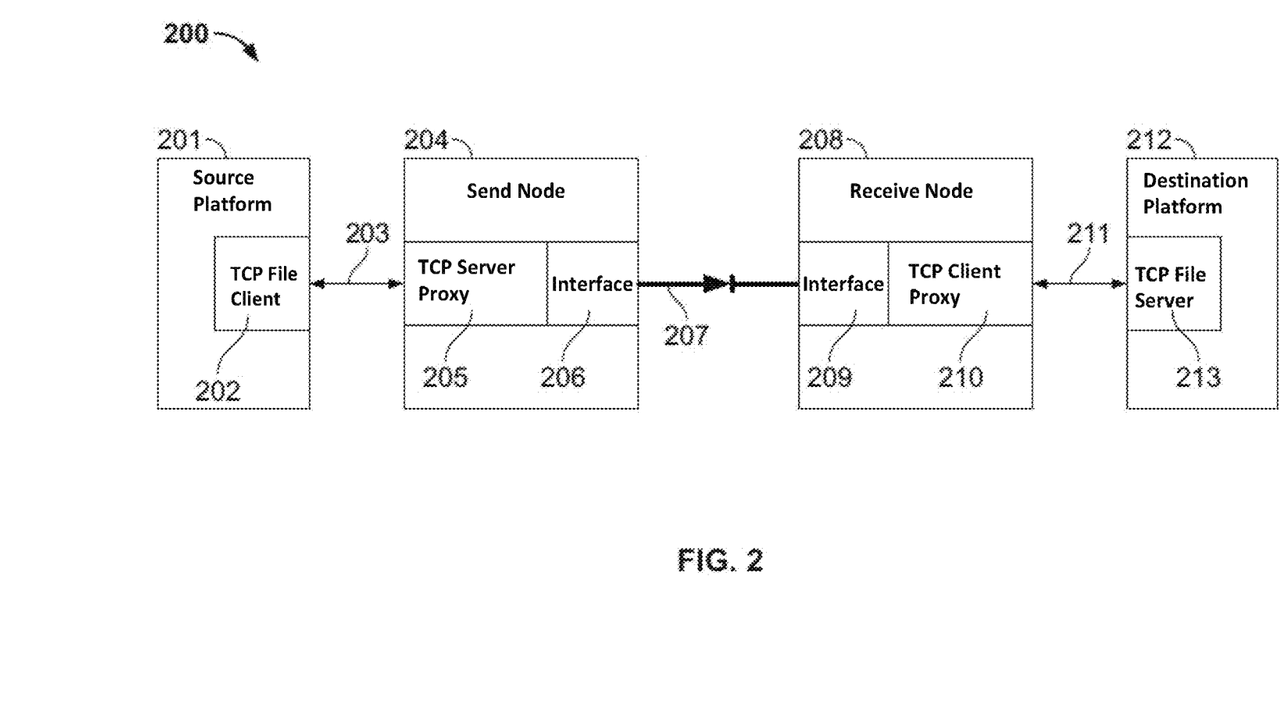
FIG. 2 is a functional block diagram that schematically illustrates TCP-based file transfer across a one-way data link.

As described in U.S. Pat. No. 8,352,450, issued on Jan. 8, 2013, the contents of which are incorporated herein by reference, files based on various conventional transport protocols may be transferred across a one-way data link under suitable arrangements. The following example illustrates transfer of files based on the Transmission Control Protocol (TCP) across a one-way data link. FIG. 2 is a functional block diagram that schematically illustrates implementation of a TCP-based secure file transfer across a single one-way data link in a one-way data transfer system 200.

Construction of the conventional TCP sockets requires bilateral communications since it requires an acknowledgement channel from the receive node to the send node. Accordingly, the conventional TCP/IP protocol cannot be implemented directly in a one-way data transfer system based on a one-way data link, since no bilateral "hand shaking" is allowed over the one-way link due to physical enforcement of unidirectionality of data flow. Instead, the one-way data transfer system 200 illustrated in FIG. 2 uses a TCP simulation application called TCP proxy, which is preferably a TCP/IP socket-based proxy software, but may also be hardware-based or based on a suitable combination of software and hardware, to simulate the TCP/IP protocol across the one-way data link 207.

In FIG. 2, a TCP server proxy 205 fully implements the TCP/IP protocol in its bilateral communications 203 with the upstream TCP file client 202 residing in a source platform 201. The TCP server proxy 205 may reside within the send node 204 as shown in FIG. 2, or alternatively, may be separate from but coupled to the send node 204. After the TCP server proxy 205 receives files from the TCP file client 202, the send node 204 sends the files through its interface 206 to the one-way data link 207. After the receive node 208 receives the files through its interface 209 from the one-way data link 207, the TCP client proxy 210 communicates under the full implementation of the TCP/IP protocol with a TCP file server 213 residing in a destination platform 212 and forwards the received files to the TCP file server 213. The TCP client proxy 210 may reside within the receive node 208 as shown in FIG. 2, or alternatively, may be separate from but coupled to the receive node 208.

In certain situations, it would be advantageous to use a one-way data link with an independent link layer protocol for one-way transfer so that non-routable point to point communications with a true IP protocol break can be enforced. With these properties, data packets or files cannot be accidentally routed in the network and other protocols (such as printer protocols, etc.) will not route across the one-way data link. An exemplary configuration enforcing such non-routable point to point communications with a true IP protocol break can be implemented in the one-way file transfer system 200 of FIG. 2. The TCP-based file transfer system 200 may be configured to prohibit transmission of IP information across the one-way data link 207. When the TCP server proxy 205 receives a file from the TCP file client 202, it removes the IP information normally carried in the file data packet headers under the TCP/IP protocol and replaces it with pre-assigned point-to-point channel numbers, so that no IP information is sent across the one-way data link 207. Instead, predetermined IP routes may be defined at the time of the configuration of the system 200 in the form of channel mapping tables residing in the TCP server proxy 205 associated with the send node 204 and the TCP client proxy 210 associated with the receive node 208. The send node 204 then sends the files with the pre-assigned channel numbers to the receive node 208 through its interface 206 across the one-way data link 207, which are received by the receive node 208 through its interface 209. Upon receipt of the files, the TCP client proxy 210 then maps the channel numbers from the received files to the corresponding predetermined IP address of a destination platform 212, to which the files are forwarded.

For the security of the overall one-way file transfer system 200, the IP address-to-channel number mapping table residing in the send node 204 may be different from the channel number-to-IP addressing mapping table residing in the receive node 208, and furthermore, neither table may be reconstructed on the basis of the other table. Neither table alone reveals the overall IP routing configuration from the source platform 201 to the destination platform 212. In this way, the IP information of the destination platform 212 may remain undisclosed to the sender at the source platform 201 and the security of the overall system 200 can be maintained.

Under the conventional TCP/IP protocol, the acknowledgement mechanism requiring bilateral communications may provide means for error detection. However, the one-way data link 207 forecloses such means. Instead, the one-way data transfer system 200 may assure file integrity by applying, for example, a hash algorithm such as MD5 to each file being transferred over the one-way data link 207. The send node 204 calculates an MD5 hash number for the file and sends the resulting hash number along with the file to the receive node 208 over the one-way data link 207. When the receive node 208 receives the file, it may re-calculate a hash number for the received file and compare the result with the hash number calculated by the send node 204. By comparing these results, the receive node 208 may be able to determine as to whether any error has occurred during the file transfer across the one-way data link.

It is an object of the present invention to provide a secure method of install payload transfer from a provider to a computer or device.

Other objects and advantages of the present invention will become apparent from the following description.

SUMMARY OF THE INVENTION

The present invention is directed to a system for providing an authenticated payload to a recipient device and includes a storage device for storing at least one payload and a provider server coupled to the storage device and configured to output a particular one of the at least one payloads and a manifest table, the manifest table including information identifying each of the at least one payloads. The system also includes a manifest engine transfer engine consisting of a manifest engine TX server having an input coupled to the provider server and an output, a data link having an input coupled to the output of the manifest engine TX server and an output, and a manifest engine RX server having an input coupled to the output of the data link and an output. The manifest engine TX server is configured to receive the payload and the manifest table from the provider server, to generate information about the received payload, to compare the information generated about the payload with the contents of the received manifest table, and, if the information about the received payload matches information for a particular one of the at least one payloads included in the received manifest table, to forward the payload on the output. The manifest engine RX server is configured to forward any payload received at the input to the output. Finally, the system includes a recipient device coupled to the output of the manifest engine RX server and configured to receive any payload output by the manifest engine RX server.

Preferably, the manifest engine TX server may add a tag to the payload to mark it as authenticated prior to forwarding the payload on the output thereof. Alternatively, the manifest engine RX server may add a tag to the payload to mark it as authenticated prior to forwarding the payload on the output thereof. Preferably, the data link is a one-way data link in which data may only pass from the input to the output.

Preferably, the provider server has two outputs, a first output for outputting the particular payload and a second output for outputting the manifest table. Likewise, the manifest engine TX server preferably has two inputs, a first input coupled to the first output of the provider server and a second input coupled to the second output of the provider server. In the alternative, the provider server has one output for outputting the particular payload and the manifest table and the manifest engine TX server has a single input coupled to the first output of the provider server. Preferably, the provider server is configured to separately tag the particular payload and the manifest table, and the manifest engine TX server is configured to identify the payload and the manifest table based upon such tags. In a further embodiment, the recipient device includes a system central processing unit and a dedicated storage device for storing authenticated payloads having a write-only input coupled to the output of the manifest engine RX server and a read-only output coupled to the system central processing unit.

In a first alternative embodiment, the present invention is a system for providing an authenticated payload to a recipient device and includes a storage device for storing at least one payload and a provider server coupled to the storage device and configured to output a particular one of the at least one payloads and a manifest table, the manifest table including information identifying each of the at least one payloads. The system also includes a manifest transfer engine consisting of a manifest engine TX server having an input coupled to the provider server and an output, a data link having an input coupled to the output of the manifest engine TX server and an output, and a manifest engine RX server having an input coupled to the output of the data link and an output. The manifest engine TX server is configured to receive the payload and the manifest table from the provider server, to generate information about the received payload, to compare the information generated about the payload with the contents of the received manifest table, and, if the information about the received payload matches information for a particular one of the at least one payloads included in the received manifest table, to forward the payload on the output. Finally, the system includes a recipient device coupled to the output of the manifest engine RX server and is configured to receive any payload output by the manifest engine RX server. The provider server is also coupled to the recipient device via a separate connection and is further configured to output the particular one of the at least one payloads based upon a request for the particular one of the at least one payloads from the recipient device. Preferably, the separate connection may be a network connection.

In a second alternative embodiment, the present invention is a system for providing an authenticated payload to a recipient device which includes a storage device for storing at least one payload and a provider server coupled to the storage device and configured to output a particular one of the at least one payloads and a manifest table, the manifest table including information identifying each of the at least one payloads. The system also includes a first manifest transfer engine comprising a manifest engine TX server having an input coupled to the provider server and an output, a data link having an input coupled to the output of the manifest engine TX server and an output, and a manifest engine RX server having an input coupled to the output of the data link and an output. The manifest engine TX server configured to receive the payload and the manifest table from the provider server, to generate information about the received payload, to compare the information generated about the payload with the contents of the received manifest table, and, if the information about the received payload matches information for a particular one of the at least one payloads included in the received manifest table, to forward the payload on the output. The manifest engine RX server is configured to forward any payload received at the input to the output. Further, the system includes a recipient device coupled to the output of the manifest engine RX server and configured to receive any payload output by the manifest engine RX server, the recipient device also having an output for requesting a payload, the request for such payload identifying a particular one of the at least one payloads. The system also includes a second manifest transfer engine including a second manifest engine TX server having an input coupled to the output of the recipient device and an output, a second data link having an input coupled to the output of the second manifest engine TX server and an output, and a second manifest engine RX server having a first input coupled to the output of the second data link, a second input coupled to the provider server and an output coupled to the provider server. The second manifest engine TX server is configured to forward any request received at the input to the output. The provider server is configured to provide a second manifest table including information identifying each of the at least one payloads. The second manifest engine RX server is configured to receive a request forwarded by the second manifest engine TX server via the second data link, to compare the received request with the information in the second manifest table and, if the particular requested payload is identified in the second manifest table, to forward the received request to the provider server via the output. Preferably, the request from the recipient device may also include second information demonstrating that the recipient device is authorized to receive the requested payload and the manifest table may also include, for each of the at least one payloads, second information identifying devices authorized to receive the associated payload. In this case, the second manifest engine RX server is also configured to compare the second information in the request with the second information in the manifest table when determining whether to forward the request to the provider server.

BRIEF DESCRIPTION OF THE DRAWINGS

The above and related objects, features and advantages of the present invention will be more fully understood by reference to the following, detailed description of the preferred, albeit illustrative and exemplary, embodiments of the present invention when taken in conjunction with the accompanying figures, wherein.

DETAILED DESCRIPTION OF THE EXEMPLARY EMBODIMENTS

In the present disclosure, like reference numbers refer to like elements throughout the drawings, which illustrate various exemplary embodiments of the presently disclosed system. Although the presently disclosed system will be discussed with reference to various illustrated examples, these examples should not be read to limit the broader spirit and scope of the present invention.

Figure 3A:
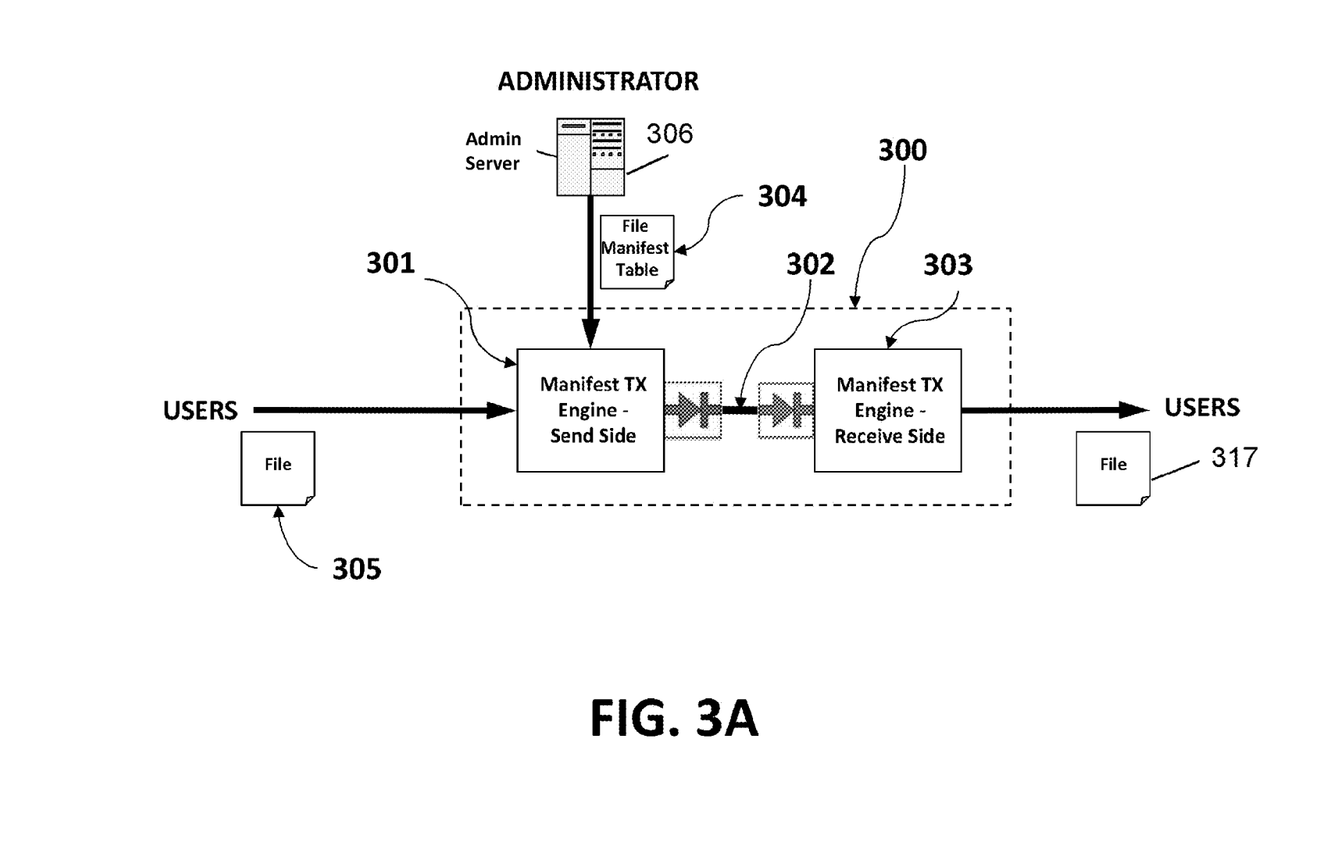
FIGS. 3A and 3B are block diagrams of a manifest transfer engine according to the present invention.

Referring now to the drawings and in particular to FIG. 3A, a manifest transfer engine 300 is shown operating as a file filtering device for securing one-way transfer of files. This addresses the need for secure and reliable transfer of potentially vulnerable files, such as executable files, BIOS, operating system (OS) or software application patch files, and anti-virus and anti-malware updates, across the network boundary between secure and insecure networks. For example, this may help securing automated one-way transfer of files into highly secure industrial control system (ICS) networks. The existing anti-virus filtering techniques typically prevent these otherwise valid file transfers. Hence, embodiments of the present invention may provide secure process for timely updates of OS and software patches and anti-virus/anti-malware programs, as well as suitable protection from zero-day attacks targeting highly secure networks.

As shown in FIG. 3A, the manifest transfer engine 300 may comprise a send side 301, a receive side 303, and a one-way data link 302 enforcing unidirectional data flow from the send side 301 to the receive side 303. The send side 301 of the manifest transfer engine 300 is configured to receive a file manifest table 304 from the system administrator (e.g., administrator server 306 shown in FIG. 3A) and store it. The send side 301 is also configured to receive files 305 to be transferred across the one-way data link 302 from the user. As further described below, the send side 301 of the manifest transfer engine 300 performs the file manifest filtering by comparing the received files 305 against the file manifest table 304 received from the administrator. Only upon validation based on the file manifest table 304 stored in the send side 301, the files 305 from the user are allowed to be transferred to the receive side 303 of the manifest transfer engine 300 via one-way data link 302.

The send side 301 of the manifest transfer engine 300 may comprise a file client configured to receive files 305 from the user and send them across the one-way data link 302 upon validation. Similarly, the receive side 303 of the manifest transfer engine 300 may comprise a file server configured to receive the files from the one-way data link 302 and forward the received file (i.e., as an authenticated file 307) to the intended recipient (e.g., a file server in the destination network). In one or more embodiments, the send side 301 and the receive side 303 of the manifest transfer engine 300 may respectively comprise a TCP file client 202 and a TCP file server 213 shown in FIG. 2, which are respectively configured to transfer and receive files across one-way data link 207 via specifically configured TCP server and client proxies 205, 210. In this case, upon validation of the file 305 based on the file manifest table 304, the manifest transfer engine 300 may operate in the same or similar manner as the TCP-based file transfer system 200 of FIG. 2 to transfer the file across the one-way data link 302.

In one or more embodiments, a user may transfer files to the send side 301 of the manifest transfer engine 300 from a USB memory stick. A special menu system (not shown) may allow the user to select a file from the USB file directory and copy and download it to the send side 301 for processing and/or validation for one-way transfer. For security reason, files to be transferred from the USB memory stick to the manifest transfer engine 300 may be required to be located in a special subdirectory (e.g., "owlsenddata") of the USB memory. Unlike a USB walk-net where any file located on a USB memory stick used to transmit files from one computer to another may be transferred, in the system shown in FIG. 3A only administrator-approved files may be transferred.

In one or more embodiments, only the designated system administrator can create, edit, and/or update the file manifest table 304 at, for example, one or more administrator servers. The file manifest table is not publicly accessible and preferably remains inaccessible by any unauthorized party. The file manifest table could even be made inaccessible by the user of the manifest transfer engine to transfer files, depending on the desired level of security for file transfer. In one or more embodiments, suitable IP filters may be defined in a configuration file for transferring the file manifest table so as to specifically designate the personal computers or servers that are allowed to send the file manifest table to the manifest transfer engine. Preferably, the transfer of the file manifest table 304 to the send side 301 of the manifest transfer engine 300 is under a strict control of the designated system administrator.

The file manifest table may be created in the form of an ASCII-only text file ("the manifest file") containing hash numbers or other forms of identification corresponding to the files that are permitted to be transferred through one-way data link 302. For example, a manifest file may be assembled by the administrator based on the hash numbers provided by the user that correspond to the files that the user wishes to transfer across the network boundary via one-way data link 302. In another example, a manifest file may be assembled by the administrator based on the hash numbers of anti-virus and anti-malware updates and/or OS and software patches that are made publicly available from software companies.

The format of the manifest files need not be strict and may only require a list of valid hash numbers. Multiple hash code algorithms may be supported by the manifest files, including, for example, MD5 128-bit checksum (Unix: md5sum), SHA 160 bit checksum (Unix: shalsum), SHA 224 bit checksum (Unix: sha224sum), SHA 256 bit checksum (Unix: sha256sum), SHA 384 bit checksum (Unix: sha384sum), and SHA 512 bit checksum (Unix: sha512sum). The use of such algorithms to generate hash codes and text files having listings of hash codes from multiple files is conventional and known to those of ordinary skill in the art.

In one or more embodiments, the send side 301 of the manifest transfer engine 300 is capable of accepting and storing multiple file manifest tables. In such embodiments, the administrator may send new, updated, or multiple file manifest tables to the send side 301, either periodically or at various suitable times, and the send side 301 can receive and store them without having to overwrite or delete the previously received and stored file manifest tables.

The manifest transfer engine 300 may perform file manifest filtering as follows: The executable or non-executable file 305 received from the user by the send side 301 of the manifest transfer engine 300 is individually validated against the file manifest table 304 stored in the send side 301. In one or more embodiments, the send side 301 calculates a hash number for the received file 305 and compares it with the registered hash numbers listed on the file manifest table 304. If there is a match, the file 305 is validated and the send side 301 allows it to be transferred to the receive side 303 via one-way data link 302. On the other hand, if no match is found, the file 305 is denied transfer across one-way data link 302 and may be quarantined or deleted by the send side 301 or by the administrator. The incident of finding no match may be logged.

In one or more embodiments, a menu system associated with the manifest transfer engine may allow the system administrator to manage the file manifest tables stored in the manifest transfer engine. Management of the file manifest tables may include viewing, revising, updating and/or deleting of the file manifest tables. Preferably, users or unauthorized third parties are not allowed to access and edit the file manifest table or any individual registered hash numbers therein.

In a further embodiment, the administrator server 306 is configured to transmit the information manifest table to send side 301 on fixed intervals, and send side 301 is configured to discard each received information manifest table after a period of time corresponding to such interval. In the alternative, the information manifest table itself could also include an expiration time/date, and send side 301 may be configured to use the current information manifest table until that date/time.

Figure 3B:
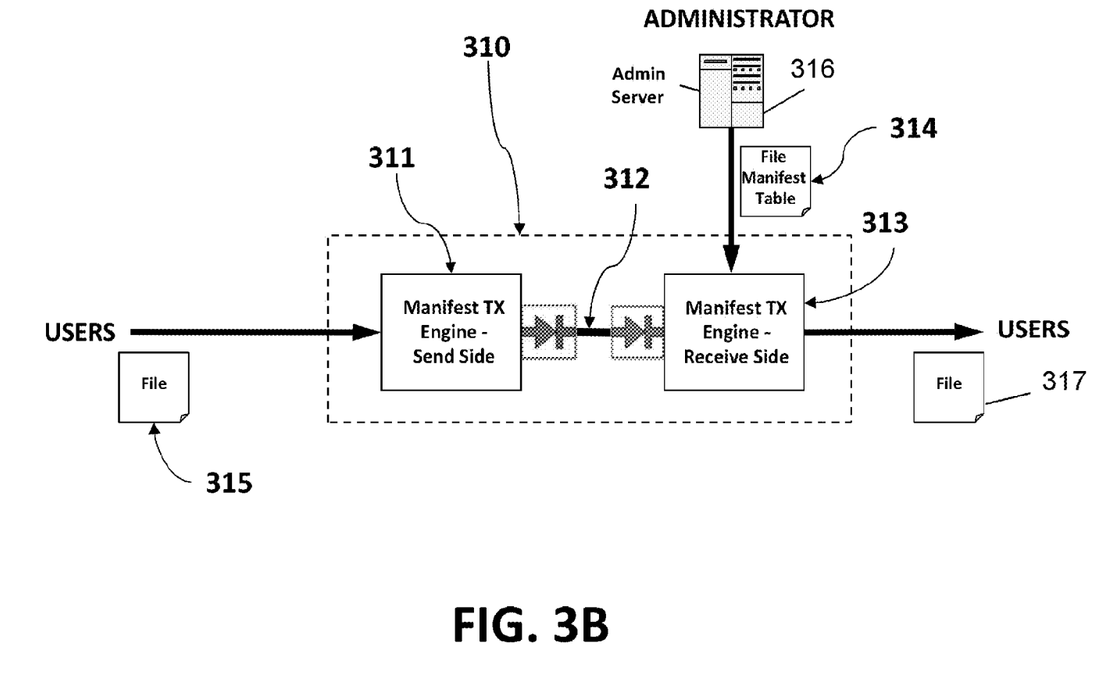

FIG. 3B illustrates an alternative exemplary embodiment of the manifest transfer engine 310. The send side 311 of the manifest transfer engine 310 is configured to receive a file 315 from the user and send it to the receive side 313 via a one-way data link 312. Unlike the manifest transfer engine 300 of FIG. 3A in which the send side 301 is configured to receive and store a file manifest table 304 from admin server 306 and perform the file manifest filtering, in the manifest transfer engine 310 of FIG. 3B, the receive side 313 is configured to receive and store a file manifest table 314 from admin server 316 and to perform the file manifest filtering by comparing the file 315 received from the one-way data link 312 against the file manifest table 314. As a further variation, the file manifest table 314 may also be provided via the one-way data link 312 instead of via a separate connection. In this case, the file manifest table 314 must be properly tagged to allow the receive side 313 to distinguish it from file 315. Only upon validation based on the file manifest table 314 stored in the receive side 313, the file 315 from the user is allowed to be released and forwarded as an authenticated file 317 to the destination. If the file fails validation based on the file manifest table 314, the receive side 313 does not release the file and may delete or quarantine the file. Except for the above described differences, other aspects of the file manifest filtering by the manifest transfer engine 310 of FIG. 3B may be same or substantially similar to those of the manifest transfer engine 300 of FIG. 3A.

As described below, the exemplary embodiments described in FIGS. 4-6 include the use of the manifest transfer engine 300 shown in FIG. 3A. However, it is noted that the exemplary embodiments shown in FIGS. 4-6 can be easily modified to use and accommodate the alternative embodiment of the manifest transfer engine 310 shown in FIG. 3B, in place of the manifest transfer engine 300 of FIG. 3A, without departing from the spirit or essential characteristics of the present invention.

Figure 4:
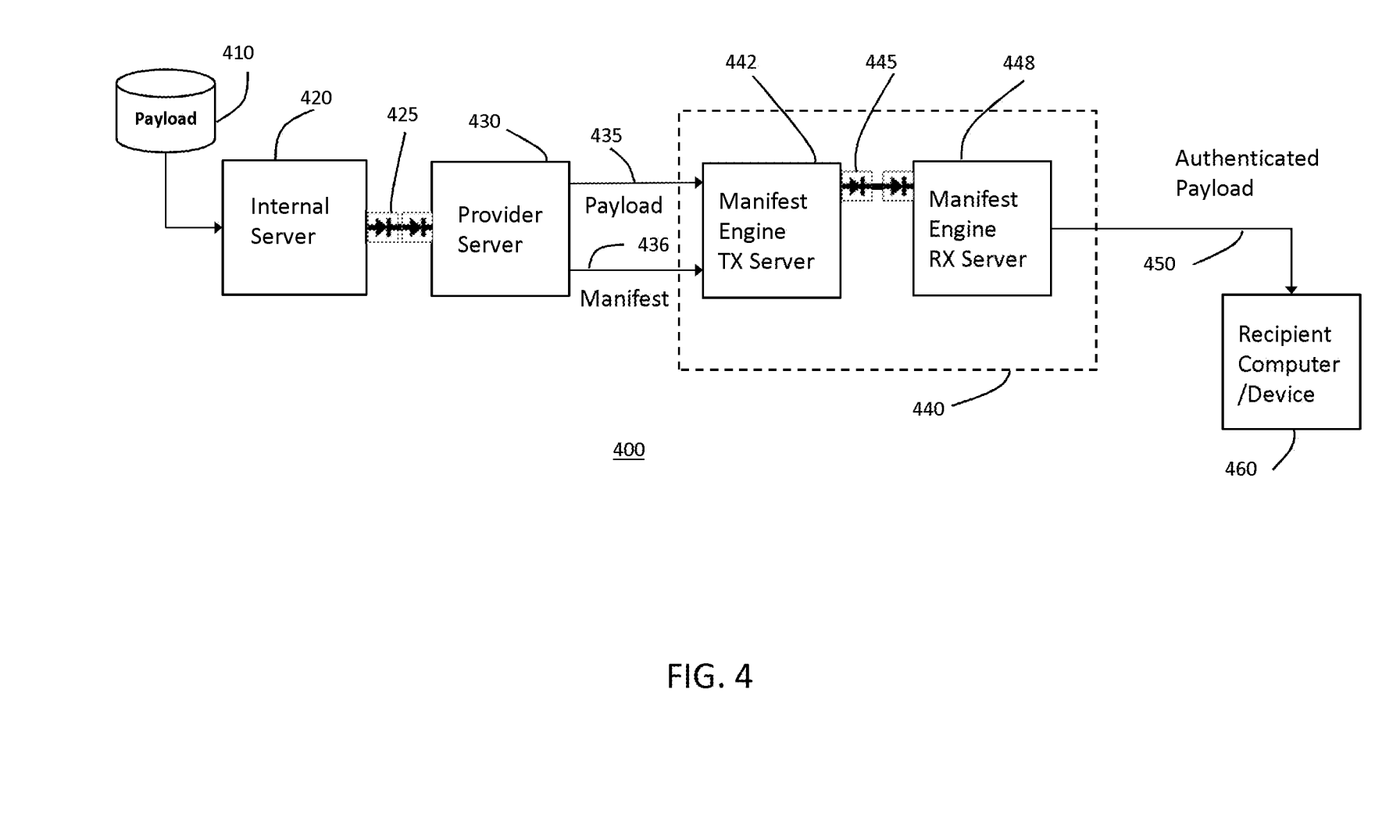
FIG. 4 is a block diagram of a first exemplary embodiment of the present invention.

FIG. 4 illustrates an exemplary network system 400 of a one-way payload (i.e., software program or software update) transfer system employing a manifest transfer engine 440. System 400 includes a file repository 410 (e.g., a memory device) which holds one or more payloads (files) for distribution to a recipient computer/device 460. As discussed above, each payload may be a complete software program, a software update, firmware, a firmware update or any other type of digital file or grouping of digital information for which secure distribution is desired. An internal server 420 coupled to file repository 410 may access the payload and supply it to a provider server 430, preferably via a one-way link 425 (although the connection between internal server 420 and provider server 430 may be a conventional two way connection and in some circumstances provider server 430 may be directly coupled to file repository 410 and internal server 420 may be omitted). Provider server 430 maintains a file manifest table identifying all the files/payloads which may be transmitted over manifest transfer engine 440, as discussed above, and upon receipt, if not already present, adds the currently received payload to the file manifest table. As discussed above, the file manifest table stores hash numbers (or equivalent information) for each file and optionally the associated file name.

To distribute the payload, provider server 430 transmits the payload via a transmit connection 435 to the manifest engine TX server, and if necessary, transmits an updated file manifest table via a separate manifest connection 436 to the manifest engine TX server before transmission of the payload. Transmit connection 435 and manifest connection 436 may each be any conventional means of conveying information known to one of ordinary skill in the art. Furthermore, although a direct connection 436 is shown in FIG. 4 between provider server 430 and manifest engine TX server 442, indirect methods for providing the file manifest table may alternatively be used. For the FIG. 4 embodiment, the key point is that connection 436 must be separate from transmit connection 435. Thus, manifest connection 436 may be, for example, a dial-up connection or a dedicated VPN channel in the case of an actual connection. For indirect methods, the file manifest table may be transmitted from the provider server 430 to the manifest engine TX server via a physical media such as a DVD or removable USB storage device (in which case the manifest engine TX server includes an appropriate means for reading such media, e.g., a DVD drive or USB interface). Furthermore, an interface may be provided to allow retrieval of the file manifest table from a secured network-based mailbox (e.g., a lockbox). Finally, the file manifest table may be provided via hard copy (e.g., printed information), and a user-administrator then uses an interface to the manifest engine TX server to manually enter the information printed on the hard copy.

If the payload is validated by the manifest transfer engine 440 based on the file manifest table 404 created and provided by the provider server, the payload is transferred over the one-way link 445 to the manifest engine RX server 448. This occurs, for example, when a hash value calculated for the payload matches a value included in the file manifest table. On the other hand, if the payload fails validation, the manifest transfer engine 440 does not allow the payload to be transferred across the one-way data link. Manifest engine RX server 448 may be configured to directly transfer the authenticated payload via a network 450 to the recipient computer/device 460. In the alternative, the authenticated payload may be transmitted to a kiosk or centralized facility for further distribution via direct communication to the recipient computer or device. In a further alternative, the receiving kiosk or centralized facility may be configured to record the payload onto a physical media (e.g., CD/DVD or thumb drive device) that is then used to transfer the payload to a recipient computer or device. Optionally, manifest engine TX server 442 may also tag the payload to mark it as authenticated before transferring the payload over the one-way link 445, or alternatively manifest engine RX server 448 may tag the payload to mark it as authenticated before transferring it to the recipient computer/device 460.

In the embodiment shown in FIG. 4, payloads are pushed to a recipient computer/device 460 based upon actions that take place at internal server 420 and provider server 430. For example, internal server 420 may be configured to transfer a new payload to provider server 430 once it is marked as released. An alternative embodiment 500 of a network structure of a one-way file transfer system employing a manifest transfer engine is shown in FIG. 5. Unlike the network structure in FIG. 4 which provides a push topology in which payloads are provided automatically upon release, in FIG. 5, the recipient computer/device 460 is also coupled to the provider server 520 via a standard network connection 510.

Computer/device 460 may then query the provider server 520, e.g., at prearranged intervals, to determine if any updates are available for installed software (of any sort, including firmware) originally supplied by the provider (or to request a new software program). If an update is available (or if a new software program is requested), the appropriate payload is accessed and provided to the manifest transfer engine 440 for transfer to recipient computer/device 460 in the same manner as discussed above. In the alternative, provider server 520 may make information available via network connection 510 (e.g., via a web browser interface) to recipient computer/device 460 indicating that updates are available for an installed program or that other software programs are available for download. Recipient computer/device 460 then may request such update or program, e.g., by clicking on a link provided by provider server 520 at any time. However, instead of directly providing such software program or update via network connection 510 (as is conventionally done, e.g., by clicking a link and then downloading the file via the browser's file download capabilities), provider server 520 instead responds to such request by separately transmitting the requested program/update in the form of a payload via manifest transfer engine 440.

Figure 5:
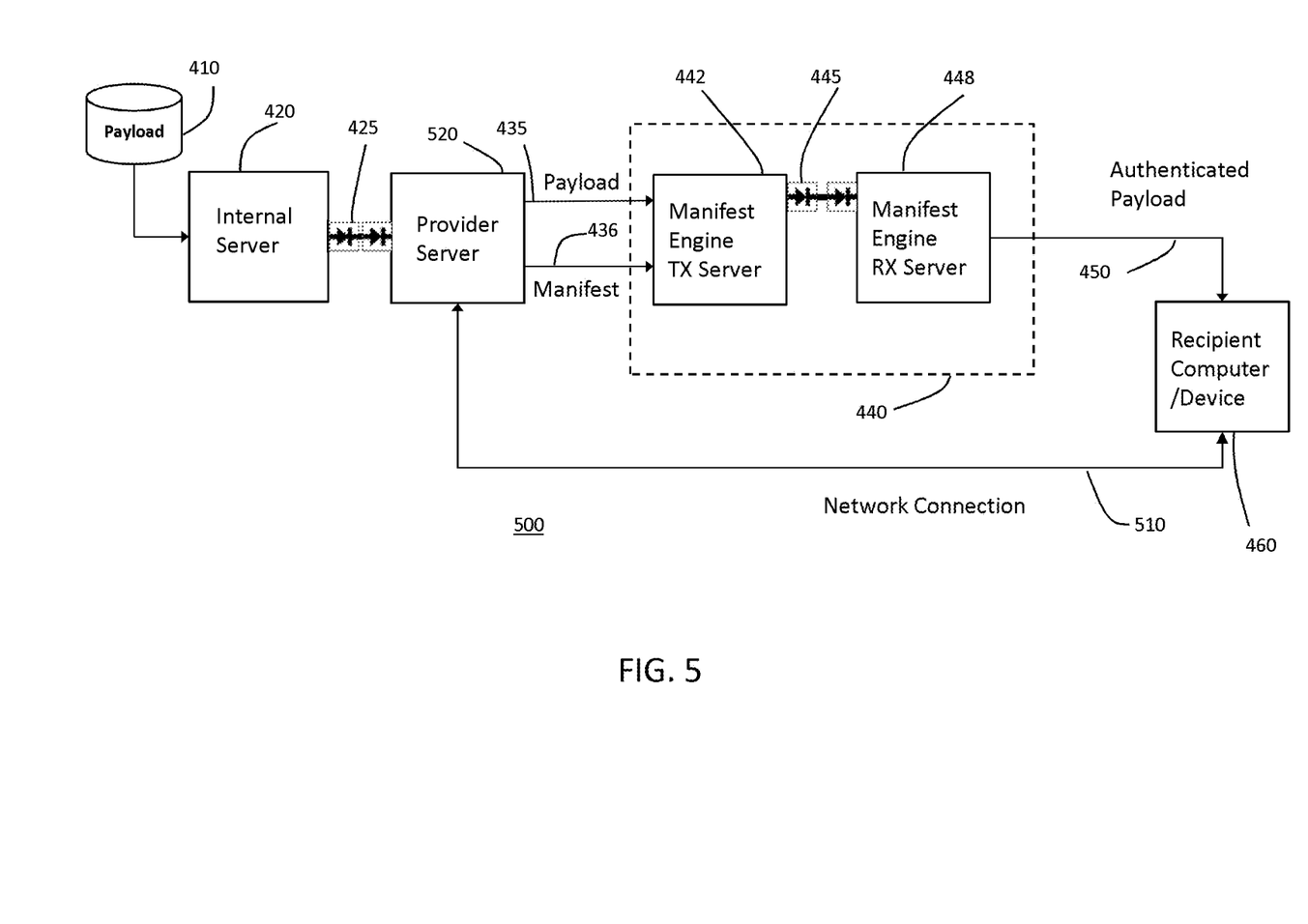
FIG. 5 is a block diagram of a second exemplary embodiment of the present invention.
Figure 6:
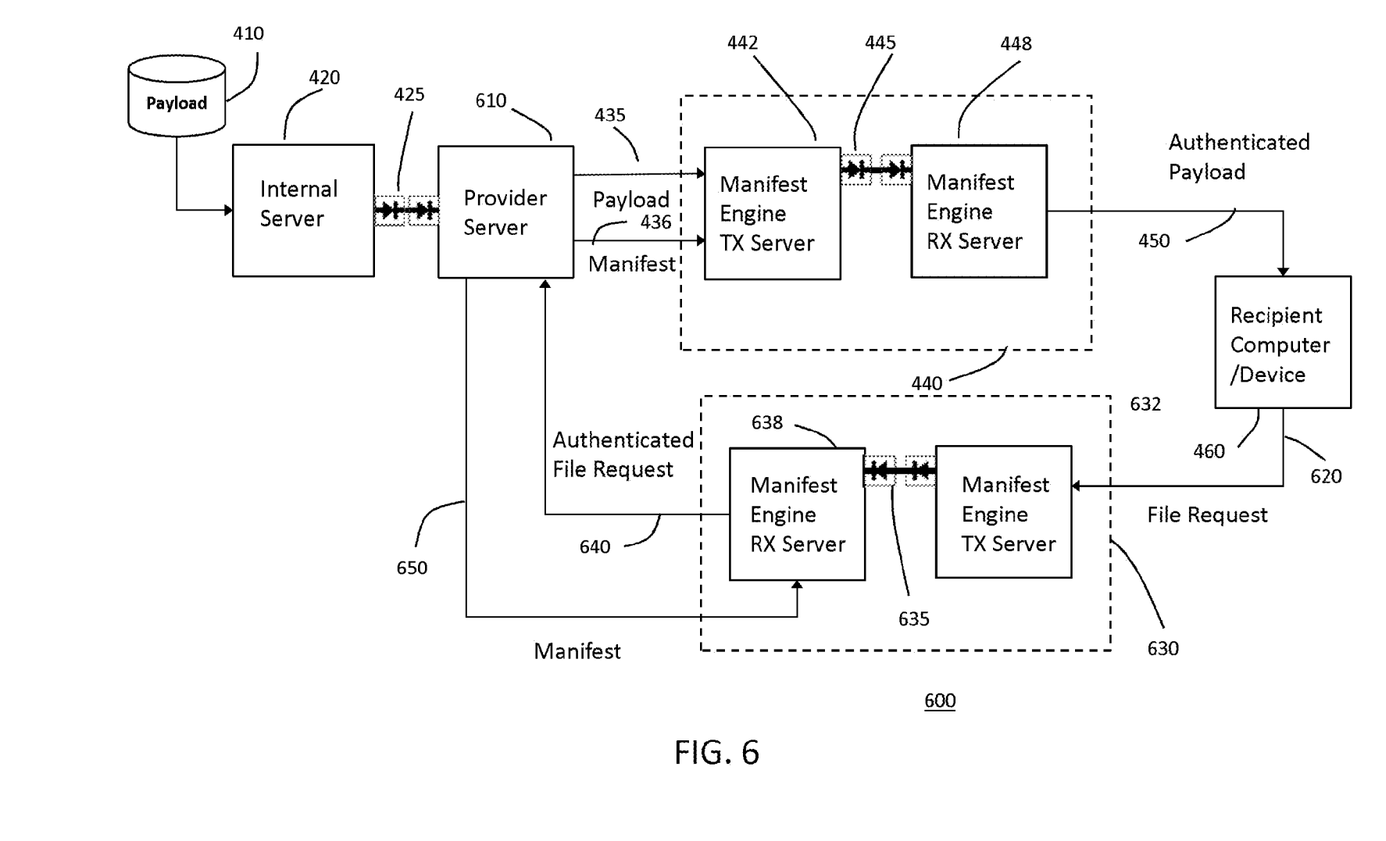
FIG. 6 is a block diagram of a third exemplary embodiment of the present invention.

FIG. 6 illustrates another exemplary implementation of a payload transfer system 600 that operates similar to the system 500 of FIG. 5. However, in this embodiment, a second manifest transfer engine 630 is provided to filter file requests from recipient computer/device 460. Here, because the file request is provided over a one-way link, any request provided to manifest engine TX server 632 must include both an update request (or a request for a new program based on some information independently acquired) and also necessarily some indication of the origin of such request. The indication of origin could include information verifying that the recipient computer/device 460 possesses a valid license to use the requested payload, e.g., a license for the software to be installed or updated. In this example, the update request and associated indication of origin are passed across the one-way link 635 to manifest engine RX server 638. Manifest engine RX server 638 compares the indication of origin information with information on the manifest provided by provider server via manifest link 650, and if a match is found, the update request is thus authenticated and passed to provider server 610 via link 640. Provider server then transmits the requested payload to recipient computer/device via manifest transfer engine 440 in the same manner as above.

Figure 7:
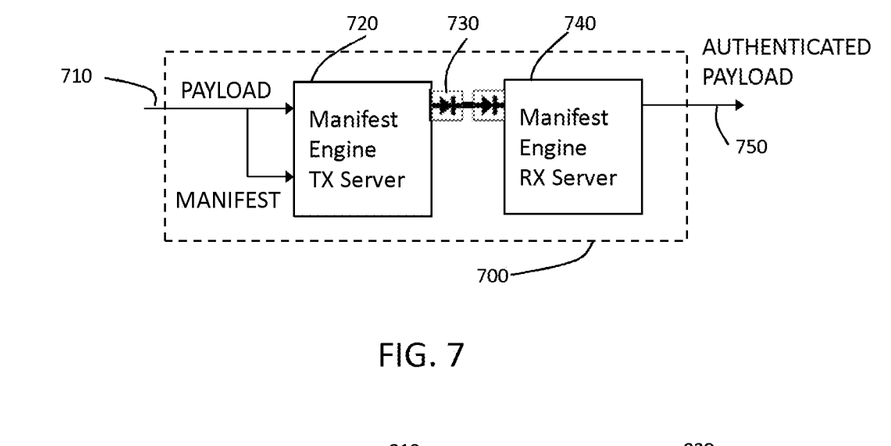
FIG. 7 is a block diagram of an alternative configuration for the manifest engine.

FIG. 7 shows an alternative configuration for the manifest transfer engine 700 having a single input 710 for receiving both the payload and the manifest at the manifest transfer engine TX server 720. Here, the payload and manifest files are tagged for identification purposes (e.g., by using predetermined filenames for the payload and manifest). The payload and manifest files may also include additional security features used to verify the source, including authentication using certificates or other encryption methods, either directly furnished by the provider server or through security features provided by a third party, or by explicit authorization by one or more system administrators. For example, the following methods may be additionally used to verify the source of the manifest: mutual authentication for manifest update using certificates, encryption keys, or men-in-the-middle processes performed directly between the payload provider and recipient or through an authenticated 3rd party. As one of ordinary skill in the art will readily recognize, there are numerous alternatives which may be used for payload checks, including but not limited to proper encryption, format, magic number, predetermined file length, predetermined machine ID, custom filtering, and timing of arrival (e.g., time of day, day of week/month, specific date and time). In this configuration, once the payload is verified at the manifest engine TX server 720, using both the additional security features (if any) and the manifest file, the authenticated payload is passed over the one-way line 730 to the manifest engine RX server 740 for output via link 750. As one of ordinary skill will readily recognize, the term "output" here should be construed broadly to include both local storage of files (e.g., for execution or other use in installing/updating software on the local computer) and for transmission to other devices coupled to the receiving device.

The manifest transfer engine 440, 700 disclosed herein provides great flexibility in distributing authenticated payloads, and may be included within servers (operated by the provider or a trusted third party) used to distribute payloads via a public network, within a local server used to distribute payloads via a private network, within a kiosk used to reproduce the payload on a CD/DVD or other type of portable storage device, within a specialized server used to transfer the payload to a specialized end device requiring a software change or update (e.g., an implanted medical device having upgradeable firmware), or within a network interface card for a personal computer.

Figure 8:
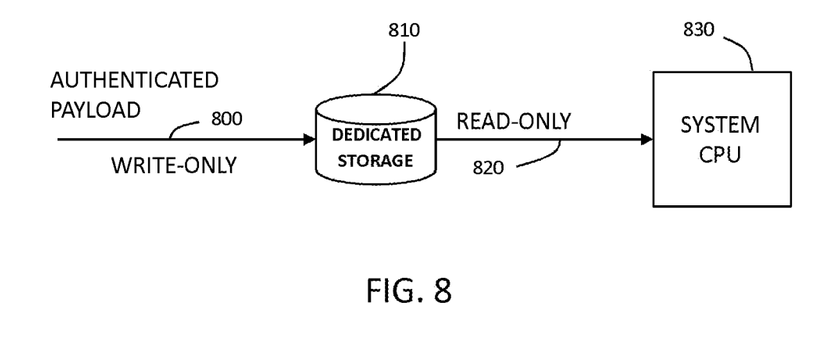
FIG. 8 is a block diagram of an additional feature for an embodiment of the present invention.

Referring now to FIG. 8, an additional feature of the present invention includes a dedicated storage device 810 for receiving and storing authenticated payloads from the manifest engine (e.g., the manifest engine 440 shown in FIG. 4) or other authenticated source. Dedicated storage device 810 may be included within the recipient computer/device 460 shown in FIGS. 4 to 6, for example. Storage device 810 includes a write-only input 800 for receiving files (and other authenticated payload information) from the manifest engine, and a read-only output 820 coupled to an output device, e.g., system central processing unit (CPU) 830. In this example, system CPU 830 is configured such that it may only execute key executable files, e.g., application installation files, BIOS, operating system (OS) or software application patch files, and anti-virus and anti-malware updates, which are stored on dedicated storage device 810 and thus properly authenticated. In a system using this configuration, executable files obtained from sources not authenticated will not be able to run and thus, in the event that such files include malware or other undesirable and/or harmful software, the unauthenticated files will be rendered harmless.

While this invention has been described in conjunction with exemplary embodiments outlined above and illustrated in the drawings, it is evident that many alternatives, modifications and variations will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. A system for providing an authenticated payload to a recipient device, comprising:
   a storage device for storing at least one payload;
   a provider server coupled to the storage device and configured to output a particular one of the at least one payloads and a manifest table, the manifest table including information identifying each of the at least one payloads;
   a manifest engine TX server coupled to the provider server, the manifest engine TX server configured to receive the particular payload from the provider server, to receive the manifest table from the provider server, to generate information about the received payload, to compare the information generated about the payload with the contents of the received manifest table, and, if the information about the received payload matches information for a particular one of the at least one payloads included in the received manifest table, to forward the payload on an output;

a data link having an input coupled to the output of the manifest engine TX server and an output;

a manifest engine RX server having an input coupled to the output of the data link and an output, and configured to forward any payload received at the input to the output; and a recipient device coupled to the output of the manifest engine RX server and configured to receive any payload output by the manifest engine RX server.

2. The system of claim 1, wherein the manifest engine TX server adds a tag to the payload to mark it as authenticated prior to forwarding the payload on the output thereof.

3. The system of claim 1, wherein the manifest engine RX server adds a tag to the payload to mark it as authenticated prior to forwarding the payload on the output thereof.

4. The system of claim 1, wherein the data link is a one-way data link in which data may only pass from the input to the output.

5. The system of claim 1, wherein the provider server has two outputs, a first output for outputting the particular payload and a second output for outputting the manifest table; and wherein the manifest engine TX server has two inputs, a first input coupled to the first output of the provider server to receive the particular payload and a second input coupled to the second output of the provider server to receive the manifest table.

6. The system of claim 1, wherein the provider server has two outputs, a first output for outputting the particular payload and a second output for outputting the manifest table; and wherein the manifest engine TX server has two inputs, a first input coupled to the first output of the provider server to receive the particular payload and a second input for indirectly receiving the manifest table output by the provider server.

7. The system of claim 1, wherein the provider server has one output for outputting the particular payload and the manifest table; and wherein the manifest engine TX server has a single input coupled to the first output of the provider server for receiving the particular payload and the manifest table.

8. The system of claim 7, wherein the provider server is configured to separately tag the particular payload and the manifest table; and wherein the manifest engine TX server is configured to identify the payload and the manifest table based upon such tags.

9. The system of claim 1, wherein the provider server is coupled to the recipient device via a separate connection and wherein the provider server is configured to output the particular one of the at least one payloads based upon a request for the particular one of the at least one payloads from the recipient device.

10. The system of claim 9, wherein the separate connection is a network connection.

11. The system of claim 1, wherein the recipient device has an output for requesting a payload, the request for such payload identifying a particular one of the at least one payloads, the system further comprising:

a second manifest engine TX server having an input coupled to the output of the recipient device and an output, and configured to forward any request received at the input to the output;

a second data link having an input coupled to the output of the second manifest engine TX server and an output; and a second manifest engine RX server having a first input coupled to the output of the second data link, a second input coupled to the provider server and an output coupled to the provider server;

wherein the provider server is configured to provide a second manifest table including information identifying each of the at least one payloads; and wherein the second manifest engine RX server is configured to receive a request forwarded by the second manifest engine TX server via the second data link and to compare the received request with the information in the second manifest table and, if the particular requested payload is identified in the second manifest table, to forward the received request to the provider server via the output.

12. The system of claim 11, wherein the request from the recipient device also includes second information demonstrating that the recipient device is authorized to receive the requested payload, wherein the manifest table also includes, for each of the at least one payloads, second information identifying devices authorized to receive the associated payload, and wherein the second manifest engine RX server is also configured to compare the second information in the request with the second information in the manifest table when determining whether to forward the request to the provider server.

13. The system of claim 1, wherein the recipient device comprises:

a system central processing unit; and a dedicated storage device for storing authenticated payloads having a write-only input coupled to the output of the manifest engine RX server and a read-only output coupled to the system central processing unit.

14. A system for providing an authenticated payload to a recipient device, comprising:

a storage device for storing at least one payload;

a provider server coupled to the storage device and configured to output a particular one of the at least one payloads and a manifest table, the manifest table including information identifying each of the at least one payloads;

a manifest engine TX server coupled to the provider server, the manifest engine TX server configured to receive the particular payload from the provider server, to receive the manifest table from the provider server, to generate information about the received payload, to compare the information generated about the payload with the contents of the received manifest table, and, if the information about the received payload matches information for a particular one of the at least one payloads included in the received manifest table, to forward the payload on an output;

a data link having an input coupled to the output of the manifest engine TX server and an output;

a manifest engine RX server having an input coupled to the output of the data link and an output, and configured to forward any payload received at the input to the output; and a recipient device coupled to the output of the manifest engine RX server and configured to receive any payload output by the manifest engine RX server, the provider server also coupled to the recipient device via a separate connection and wherein the provider server is configured to output the particular one of the at least one payloads based upon a request for the particular one of the at least one payloads from the recipient device.

15. The system of claim 14, wherein the separate connection is a network connection.

16. A system for providing an authenticated payload to a recipient device, comprising:
- a storage device for storing at least one payload;
- a provider server coupled to the storage device and configured to output a particular one of the at least one payloads and a manifest table, the manifest table including information identifying each of the at least one payloads;
- a manifest engine TX server coupled to the provider server, the manifest engine TX server configured to receive the particular payload from the provider server, to receive the manifest table from the provider server, to generate information about the received payload, to compare the information generated about the payload with the contents of the received manifest table, and, if the information about the received payload matches information for a particular one of the at least one payloads included in the received manifest table, to forward the payload on an output;
- a data link having an input coupled to the output of the manifest engine TX server and an output;
- a manifest engine RX server having an input coupled to the output of the data link and an output, and configured to forward any payload received at the input to the output;
- a recipient device coupled to the output of the manifest engine RX server and configured to receive any payload output by the manifest engine RX server, the recipient device also having an output for requesting a payload, the request for such payload identifying a particular one of the at least one payloads;
- a second manifest engine TX server having an input coupled to the output of the recipient device and an output, and configured to forward any request received at the input to the output;
- a second data link having an input coupled to the output of the second manifest engine TX server and an output; and
- a second manifest engine RX server having a first input coupled to the output of the second data link, a second input coupled to the provider server and an output coupled to the provider server;
- wherein the provider server is configured to provide a second manifest table including information identifying each of the at least one payloads; and wherein the second manifest engine RX server is configured to receive a request forwarded by the second manifest engine TX server via the second data link, to compare the received request with the information in the second manifest table and, if the particular requested payload is identified in the second manifest table, to forward the received request to the provider server via the output of the second manifest engine RX server.

17. The system of claim 16, wherein the request from the recipient device also includes second information demonstrating that the recipient device is authorized to receive the requested payload, wherein the manifest table also includes, for each of the at least one payloads, second information identifying devices authorized to receive the associated payload, and wherein the second manifest engine RX server is also configured to compare the second information in the request with the second information in the manifest table when determining whether to forward the request to the provider server.

18. A manifest transfer engine comprising:
- a server for sequentially outputting a series of file manifest tables, each file manifest table of the series including file information and being outputted at a predetermined fixed time interval after the output of the immediately preceding file manifest table of the series;
- a send side having an input and an output and configured to receive and store each of the series of file manifest tables from the server, the send side further configured to discard each file manifest table of the series of file manifest tables after the expiration of a period of time equal to the predetermined fixed interval so that only a single file manifest table is stored at any point in time, the send side still further configured to receive a file from a user on the input, to compare the received file with the file information in the currently stored file manifest table and, only if there is a match between the file and the file information in the currently stored file manifest table, to transmit the received file on the output;
- a one-way data link having an input coupled to the output of the send side and an output and configured to enforce unidirectional data flow from the input to the output; and
- a receive side having an input coupled to the output of the one-way data link.

19. A manifest transfer engine comprising:
- a server for outputting a file manifest table, the file manifest table including file information and time information;
- a send side having an input and an output and configured to receive and store the file manifest table from the server, the send side further configured to discard the file manifest table after a period of time equal to the time information, the send side still further configured to receive a file from a user on the input, to compare the received file with the file information stored in the file manifest table and, only if there is a match between the file and the file manifest table, to transmit the received file on the output;
- a one-way data link having an input coupled to the output of the send side and an output and configured to enforce unidirectional data flow from the input to the output; and
- a receive side having an input coupled to the output of the one-way data link.

* * * * *